June 29, 1965    J. H. WYMAN    3,191,773
BOTTLE-CLEANLINESS INSPECTION APPARATUS
Filed April 11, 1960    2 Sheets-Sheet 1
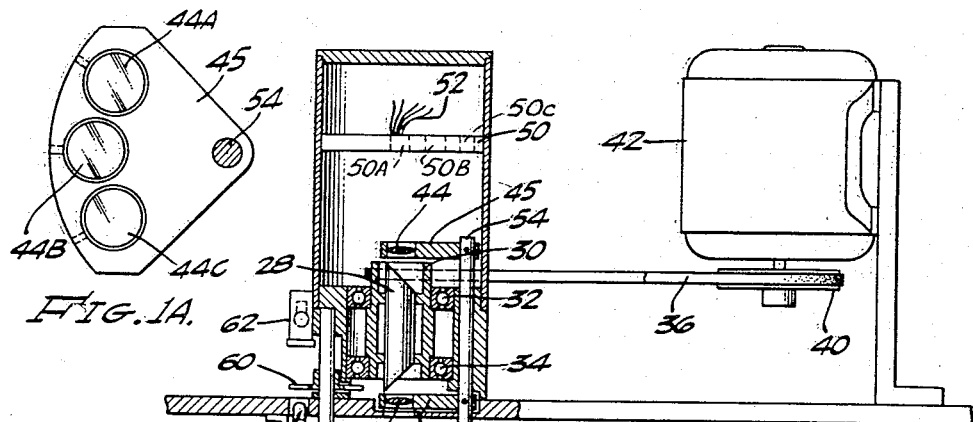
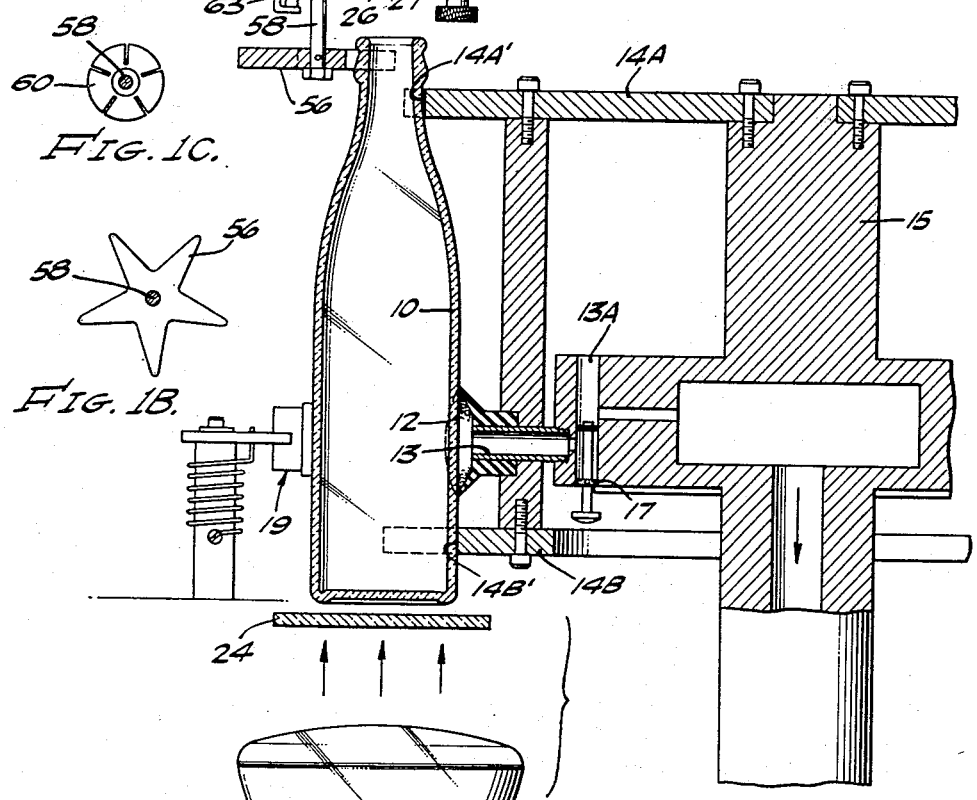
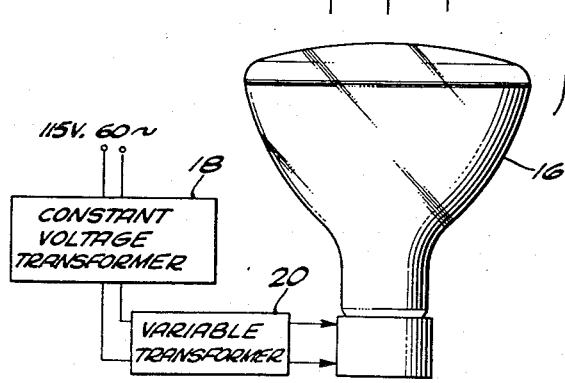
JAMES H. WYMAN
INVENTOR.
BY Lyon+Lyon
ATTORNEYS June 29, 1965     J. H. WYMAN     3,191,773
BOTTLE-CLEANLINESS INSPECTION APPARATUS
Filed April 11, 1960     2 Sheets-Sheet 2
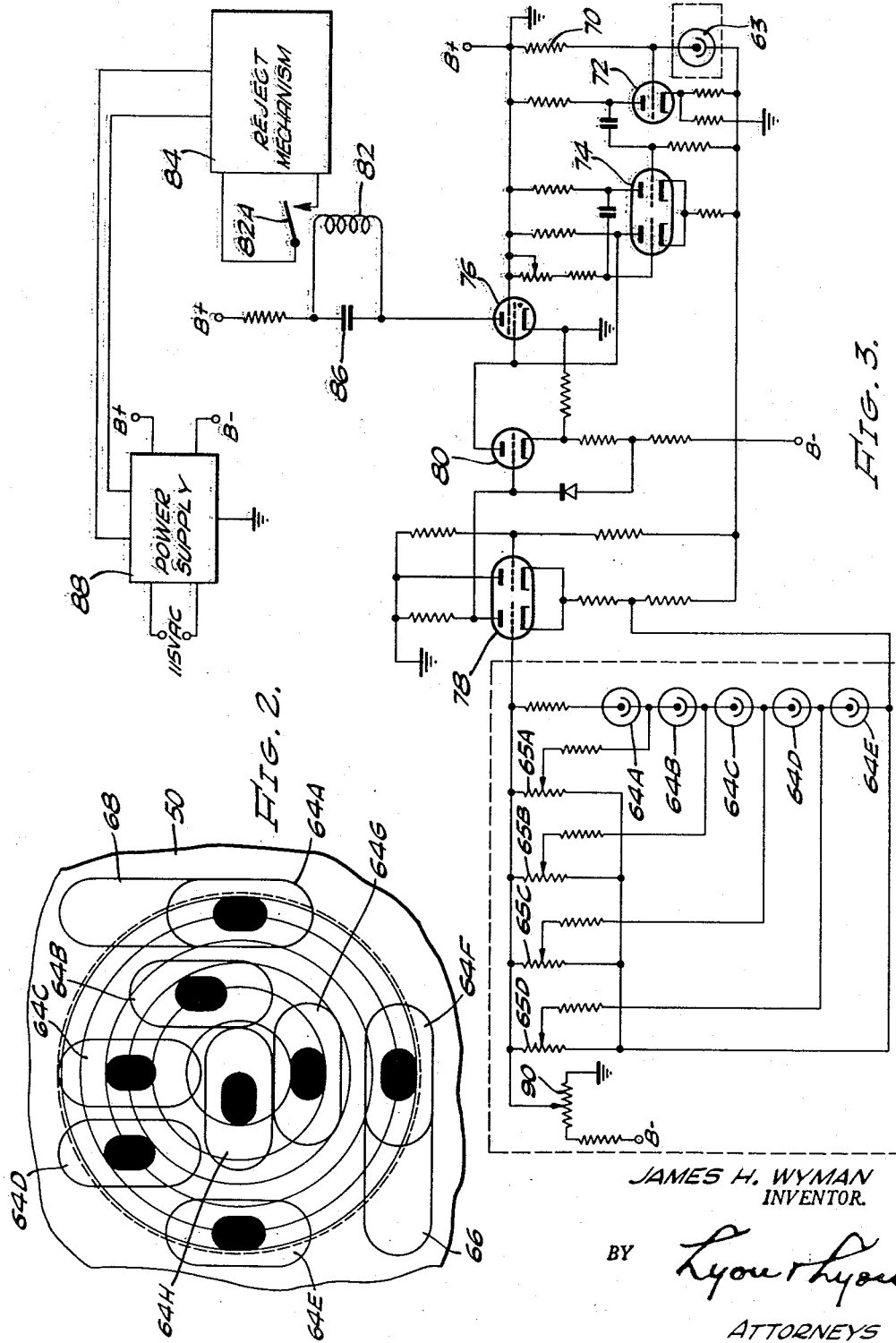
JAMES H. WYMAN
INVENTOR.
BY Lyon & Lyon
ATTORNEYS United States Patent Office 3,191,773
Patented June 29, 1965

3,191,773
BOTTLE-CLEANLINESS INSPECTION APPARATUS
James H. Wyman, San Pedro, Calif., assignor, by mesne assignments, to Barry-Wehmiller Machinery Co.
Filed Apr. 11, 1960, Ser. No. 21,164
8 Claims. (Cl. 209—111.7)

This invention relates to apparatus for inspecting empty bottles for cleanliness and, more particularly, to improvements therein.

It is an object of this invention to provide a novel and improved empty-bottle-cleanliness inspection machine.

It is another object of this invention to provide an empty-bottle inspection machine capable of adjustment for varying sizes and styles of bottles.

It is yet another object of the present invention to provide an empty-bottle inspection apparatus which is simple and does not require any critical adjustments, and yet provide highly sensitive detection of foreign matter in the bottle.

It is still another object of the present invention to provide an empty-bottle inspection machine which can be adapted to inspect bottles of varying degrees of opacity.

These and other objects of the invention may be achieved in an arrangement wherein an empty bottle to be inspected is passed through an inspection zone defined by a light source at one side of the bottle and detecting apparatus at the other side of the bottle. The detecting apparatus is energized each time a bottle is positioned within the inspection zone. Light passing through the bottle is permitted to pass first through a collimating lens, then through a prism which is rotated at a suitable speed. The collimated light output of the prism is focussed by a second lens upon a plurality of photocells which are arranged in a pattern so that every portion of the field falling thereon from the prism is scanned. The rotating prism serves to rotate the field of light derived from the bottle at a speed high enough so that a complete scan is achieved before the bottle moves out of the inspection zone. Any foreign matter within the bottle causes a reduction in the light falling on the pattern of photocells. This is detected and the bottle is rejected.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a sectional view of an embodiment of the invention;

FIGURE 1A is a view of a preferred type of lens holder used in the invention;

FIGURE 1B is a plan view of a starwheel used in the invention;

FIGURE 1C is a plan view of a slotted disc used in the invention;

FIGURE 2 shows a preferred arrangement of photocells in accordance with this invention; and FIGURE 3 is a block diagram of the electronic circuit which is employed in the embodiment of the invention.

The handling of bottles so that they may be passed into and out of the inspection zone and rejected, if necessary, may be performed most easily by a multi-pocket starwheel which overhangs the conveyor such that bottles are momentarily passed off the conveyor for inspection. A preferred arrangement is shown which is derived from principles thoroughly described in Patent No. 2,800,226. Accordingly, the details of this inspection machine are only suggested in FIGURE 1, which is a sectional view of an embodiment of the invention. A bottle 10 is carried through an inspection zone by a pair of starwheels 14A, 14B, having pockets 14A', 14B' formed therein for the purpose. The starwheel is attached to a rotor 15 to be driven. For each pocket in the starwheel there is provided a suction cup 12. A vacuum can be applied to this cup through a passageway 13 connected through a valve passageway 13A to the vacuum source, not shown. A valve 17, shown in its nonreject position, normally prevents vacuum from being applied to a suction cup. A bottle is moved by the starwheel from a conveyor, through the bottle-inspection zone, and then back to the conveyor or removed to a reject bottle accumulator, not shown. A bottle is held properly in the inspection position over a light source 16 by a spring-loaded bar 19. The starwheel pair 14A, 14B may be changed for runs of different bottle sizes. The bottle 10 in FIGURE 1 is shown being held in the inspection zone. At one side of this inspection zone is a high-intensity incandescent light source 16, which usually is positioned opposite the bottom of the bottle 10. In order to avoid any difficulty which can be caused by variations in intensity of the illuminating light source, the light source 16 receives its power through a constant-voltage transformer 18, which in turn feeds a variable transformer 20. Since photoelectric cells are being employed for performing the foreign matter detection function, variations in intensity of the light source can cause reactions akin to that caused by foreign matter in a bottle, as far as the detection function by the photocells is concerned. This is avoided by employing a constant-voltage transformer 18. The variable transformer 20 is employed so that the level of intensity of illumination may be varied in order to adjust the light source to compensate for styles of bottles having different degrees of opacity. Stated otherwise, for a run of darker bottle types the light-source intensity may be increased, and for a run of lighter types of bottles may be decreased, by varying the voltage applied to the light source 16, using the variable transformer 20. It must be noted, however, that this intensity adjustment is only made for a given run of bottles and not for each bottle.

The illumination from the light source 16 passes through a diffused opalized glass 24. The function of this glass is to eliminate any false detection which may be occasioned by shadowing of lettering which may appear in the bottom of a bottle. The change of intensity of light on any given photocell due to the imaging of the smallest particle of foreign matter which is to be detected is far greater than the random fluctuations of light intensity on any photocell caused by variations in glass thickness and light transmission between clean bottles of a given type.

Light rays from the bottom of the bottle are collimated by a lens 26. The focal length of this lens is equal to the distance of the lens from the bottom of the bottle. The collimated rays then pass through a prism 28. A preferred type of prism is known as a "Dove" prism. This optical component is sometimes called an "inverting prism." It is necessary that approximately plane wave fronts be passed through the prism, otherwise the image on one side of the prism of an object on the other side of the prism will be distorted. The Dove prism is mounted in a holder 30, which, in turn, is supported by bearings 32, 34. The holder of the prism, and therewith the prism, is rotated about the center by means of a belt 36, which passes over the holder 30 and is driven by a pulley 40, which, in turn, is driven by a motor 42.

The collimated light output from the prism is focussed in turn by another lens 44 upon a mask 50, which is in front of photocells in a pattern such as shown in FIG- URE 2. In FIGURE 1, the leads 52 of the photocells may be seen. The function of the lens 44 is to form an image of the bottom of the bottle on the mask 50. The mask 50 has apertures, such as 50A, 50B, 50C, one for each photocell used, to permit the light focused on the mask to fall upon the sensitive area of each photocell. The prism serves to rotate the image about its axis of symmetry. The image rotates at a speed which is twice that of the prism. It should be noted that the lenses 26 and 44 are supported in holders 27, 45 on a shaft 54. Each holder may have several lenses. FIGURE 1A is a plan view of one such multiple lens holder 45 with lenses 44A, 44B, and 44C. The holders are indexed on the support shaft such that any pair of lenses may be aligned concentric with the prism by rotating the shaft and providing a suitable detent. The lens system must be changed to accommodate different bottle heights and diameters. The entire inspection head structure is raised or lowered so that the bottom lens just barely clears the bottle. In order to satisfy the requirement of approximately plane wave fronts through the prism, the bottom lens is such that its focal length is just slightly greater than the height of the bottle being inspected. The focal length of the top lens must be such that a constant image diameter is maintained for different bottle sizes.

A small starwheel 56 engages the neck of each bottle which is passed through the inspection zone. FIGURE 1B is a plan view of this starwheel. The starwheel 56 is mounted on a shaft 58, which rotates as a result of being engaged by the bottle passing into and out of the inspection zone. Also mounted on the shaft to be rotatable therewith is a disc 60. FIGURE 1C is a plan view of this disc. This disc has radial slots therein which are positioned so that light will pass from a light bulb 62 through an aperture in the disc 60 to a photocell 63. The radial slots in the disc 60 are positioned so that the light can fall upon the photocell only at such time as a bottle 10 is in the inspection zone.

Reference is now made to FIGURE 2, which is a view looking down at the top of the mask 50. It will be seen that a plurality of photocells 64A, 64B, 64C, 64D, 64E, 64F, 64G, and 64H are employed for scanning the image of the bottom of the bottle. The preferred pattern of the photocells provides substantially a 360° spiral pattern, but may be any pattern such that the image of the bottom of the bottle is completely inspected during one rotation of the image about its center. The solid-line oval configuration of each one of the photocells represents the outline of its case, and the shaded oval configuration in the center of the case comprises the sensitive area of each photocell. The circles illustrate how the sensitive areas of the photocell cover the entire field to be inspected as it is rotated by the prism. The apertures in the mask such as 50A, 50B, 50C (see FIGURE 1) allow the light to fall upon this sensitive area. However, large slots are provided for the photocells 64A and 64F, as represented by the reference numerals 66, 68. These large slots are provided to permit adjustment of the inspection radius of these particular photocells. The reason that only the sensitive area of a photocell is employed for inspection is that this improves the resolution of the system. The arrangement of the photocells is such that a complete scan of the image is made during one rotation. Any pattern of photocells may be chosen as long as every radial increment of the image circle is overlapped by one or more of the photocells when the image is rotated 360° about its axis of symmetry. A spiral, or staggered pattern, is preferred to prevent mechanical interference of the bodies of the photocells.

The photocells are wired into a circuit such that when any one of them is momentarily occulted by a dark spot in the image caused by foreign matter obscuring part of the uniform illumination beneath the bottle, the output voltage changes by a percentage which can be detected. Since the image rotates very rapidly, it is essential that the photocells be of a type with a very short time constant. For reliable operation, it is also necessary that the photocells be fairly sensitive; i.e., that they have a reasonable "light" to "dark" current ratio. The change in photocell output voltage manifests itself as a short pulse. This pulse is amplified and caused to operate a relay amplifier to reject the bottle. A suitable circuit arrangement is shown in FIGURE 3.

Only five of the photocells 64A, 64B, 64C, 64D, and 64E are shown in FIGURE 3. It will be understood, however, that this is by way of simplifying the drawings and is not to be construed as a limitation upon the invention, since as many of the photocells as are required for a complete spiral or staggered orthogonal pattern to inspect the field may be employed in a circuit of the type exemplified in FIGURE 3. A photocell 63 receives illumination when a bottle is positioned in the inspection mechanism. The photocell 63 is connected to B+ by a resistor 70. The change in its resistance caused by the light falling thereon will cause a pulse to be applied to the control grid of a tube 72. The output of the tube 72 drives a one-shot multivibrator 74. The output of the multivibrator is applied to the control grid of a thyratron tube 76. In and of itself, the output of the one-shot multivibrator 74 is insufficient to cause the thyratron 76 to become conductive. This apparatus insures an operation of the reject mechanism only while a bottle is being inspected.

When the photocell 63 is triggered, substantially simultaneously therewith the photodiodes 64A through 64E are inspecting the bottle for foreign matter. Any decrease in the illumination falling on any one or more of these photocells caused by the presence of foreign matter in the bottle results in a signal pulse being applied to the control grid of a differential amplifier 78. The output of the differential amplifier 78 is applied to a tube 80, which has its anode direct-coupled to the control grid of the thyratron tube 76. Accordingly, the signals from the multivibrator 74 and the direct-coupled tube 80 are added on the control grid of the thyratron tube 76, causing it to fire. As a result, a relay 82, which is in series with the anode of the tube 76, is enabled to become operative, closing associated contacts 82A.

The associated contacts 82A cause a bottle-reject mechanism 84 to become operative. A capacitor 86, which is connected across the relay coil 82, discharges through the tube 76 when it is rendered conductive. Then, when the capacitor begins to charge up again, it drops the tube anode voltage and thus the voltage across the tube 76 below the value necessary to maintain firing, and the tube 76 has its conduction extinguished. It is then in condition for the next inspection. Of course, when tube 76 is no longer conductive, the relay 82 is rendered inoperative. A power supply for direct current and for the reject mechanism is represented by the rectangle 88, designated by the label "power supply."

The bottle-reject mechanism includes the reject valve 17, shown in FIGURE 1. For a reject operation, this valve is moved upward from the position shown, whereby vacuum is applied to the suction cup 12. Thus, the bottle is carried to a reject bottle accumulator where a cam, not shown, returns the reject valve 17 to the position shown.

A potentiometer 65A, 65B, 65C, 65D is connected between the control grid of the tube 78 and the cathode of the respective photocells 64A, 64B, 64C, 64D. These photocells are connected in series and then to the control grid of amplifier 78. Another potentiometer 90 is connected between a source of negative potential and ground. The potentiometer arm is connected also to the control grid of the tube 78. The potentiometers 65A through 65D enable the adjustment of the signal which is obtained from each one of the photodiodes, so that any differences caused by differences in characteristics of the photodiodes may be compensated for. In addition, the bias level for the tube 78 is established by the potentiometer 90, which may be used as a sensitivity control. Any change in resistance of one of the series-connected photocells is detected, amplified, and, if it occurs while the one-shot multivibrator is providing an output to tube 76, will cause the reject mechanism to be operated.

The operation of the reject mechanism in response to detection of foreign matter by the photocells is extremely rapid, in view of the fact that that portion of the circuitry which inspects the image of the bottom of the bottle is direct-coupled to the reject mechanism.

There has accordingly been described and shown herein a novel and simple arrangement for inspecting empty bottles for cleanliness. The apparatus shown affords not only variation of the light source for bottle styles of differing opacity, but also permits the inspection of different sizes and styles of bottles. In view of the scanning pattern obtained by using a plurality of photocells, and, in addition, in view of the fact that only the sensitive areas of the photodiodes are used, a very fine resolution scan of the bottles is achieved, as a result of which particles of a much smaller size than could be detected heretofore can be detected by this mechanism. The rapid rotation of the illuminated image insures at least one complete and thorough inspection of a bottle while in the inspection zone.

I claim:

1. Apparatus for inspecting bottles for cleanliness comprising a source of illumination positioned opposite the bottom of a bottle to be inspected to provide an illuminated image thereof, means for collimating the light passing through said bottle positioned opposite the top of said bottle, means for rotating said collimated light, a plurality of photocells arranged in a pattern such that every radial increment of the image to be inspected is covered at least once by one or more of the photocells during one complete rotation of the collimated light about its axis of symmetry, means for focussing said rotated collimated light upon said plurality of photocells for affording scanning of said illuminated image thereby, and means responsive to output from said plurality of photocells in the presence of foreign matter in said bottle to provide an indication thereof.

2. Apparatus as recited in claim 1 wherein said means for rotating said collimated light comprises a prism, means for mounting said prism to be rotatable, and means for rotating said prism.

3. Apparatus for inspecting bottles for cleanliness comprising a source of illumination opposite the bottom of a bottle to be inspected to provide an illuminated image thereof, means connected to said source of illumination for varying the intensity of said illumination for compensating for bottle styles of different degrees of opacity, a prism, means for rotatably supporting said prism opposite the top of said bottle, means for rotating said rotatably supported prism, a first lens means interposed between said prism and the top of said bottle for collimating the light passing through said bottle for said prism, a plurality of photocells arranged in a pattern such that every radial increment of the image to be inspected is covered at least once by one or more of the photocells during one complete rotation of said prism, a second lens means interposed between said prism and said plurality of photocells for focussing the light from said prism upon said plurality of photocells for affording scanning of said illuminated image thereby, and means responsive to output from said plurality of photocells in the presence of foreign matter in said bottle to provide an indication thereof.

4. Apparatus as recited in claim 3 wherein said means responsive to output from said plurality of photocells in the presence of foreign matter in said bottle to provide an indication thereof includes means for connecting said photocells in series, an amplifier having an input and an output, means for connecting said series-connected photocells to said amplifier input, and a bottle-rejection means connected to be activated by said amplifier output.

5. In apparatus for inspecting bottles for cleanliness wherein there is positioned a source of illumination opposite the bottom of a bottle to be inspected to provide an illuminated image thereof, and means for detecting a change in the illumination of said illuminated image positioned opposite the top of said bottle, the improvement in said means for detecting comprising a plurality of photocells arranged in a spiral pattern positioned opposite the top of said bottle to receive said illuminated image, and means for rotating said illuminated image relative to said plurality of photocells.

6. In apparatus for inspecting bottles for cleanliness wherein there is positioned a source of illumination opposite the bottom of a bottle to be inspected to provide an illuminated image thereof, and means for detecting a change in the illumination of said illuminated image positioned opposite the top of said bottle, the improvement in said means for detecting comprising a plurality of photocells arranged in a pattern such that every radial increment of the image to be inspected is covered at least once by one or more of the photocells during one complete rotation of the image about its axis of symmetry positioned opposite the top of said bottle, a prism, means for rotatably supporting said prism between the top of said bottle and said plurality of photocells to receive light passing through said bottle, means for rotating said rotatably supported prism, and means for focussing the light passing through said prism upon said plurality of photocells to be scanned thereby.

7. In apparatus as recited in claim 6 wherein a mask is positioned between said plurality of photocells and said means for focussing having apertures which open only the most sensitive zone of each of said plurality of photocells to said rotated illuminated image.

8. In apparatus as recited in claim 6 wherein a collimating lens is inserted between said prism and the top of said bottle to collimate the illuminated image for said prism.

References Cited by the Examiner

UNITED STATES PATENTS

| | | |
|---|---|---|
| 1,647,631 | 11/27 | Ives. |
| 1,926,824 | 9/33 | Stogoff _____ 209—111 X |
| 2,231,186 | 2/41 | Gould _____ 209—111.1 X |
| 2,265,037 | 12/41 | Gulliksen. |
| 2,431,519 | 11/47 | Stoate _____ 209—111 X |
| 2,750,519 | 6/56 | Summerhayes et al. __ 209—111 X |
| 2,800,226 | 7/57 | Drennan _____ 209—111 |
| 2,884,540 | 4/59 | Shockley. |
| 2,943,531 | 7/60 | Bentley. |

ROBERT B. REEVES, *Acting Primary Examiner.*

CLAUDE A. LE ROY, ROBERT C. RIORDON,
*Examiners.*